United States Patent Office 3,364,598
Patented Jan. 23, 1968

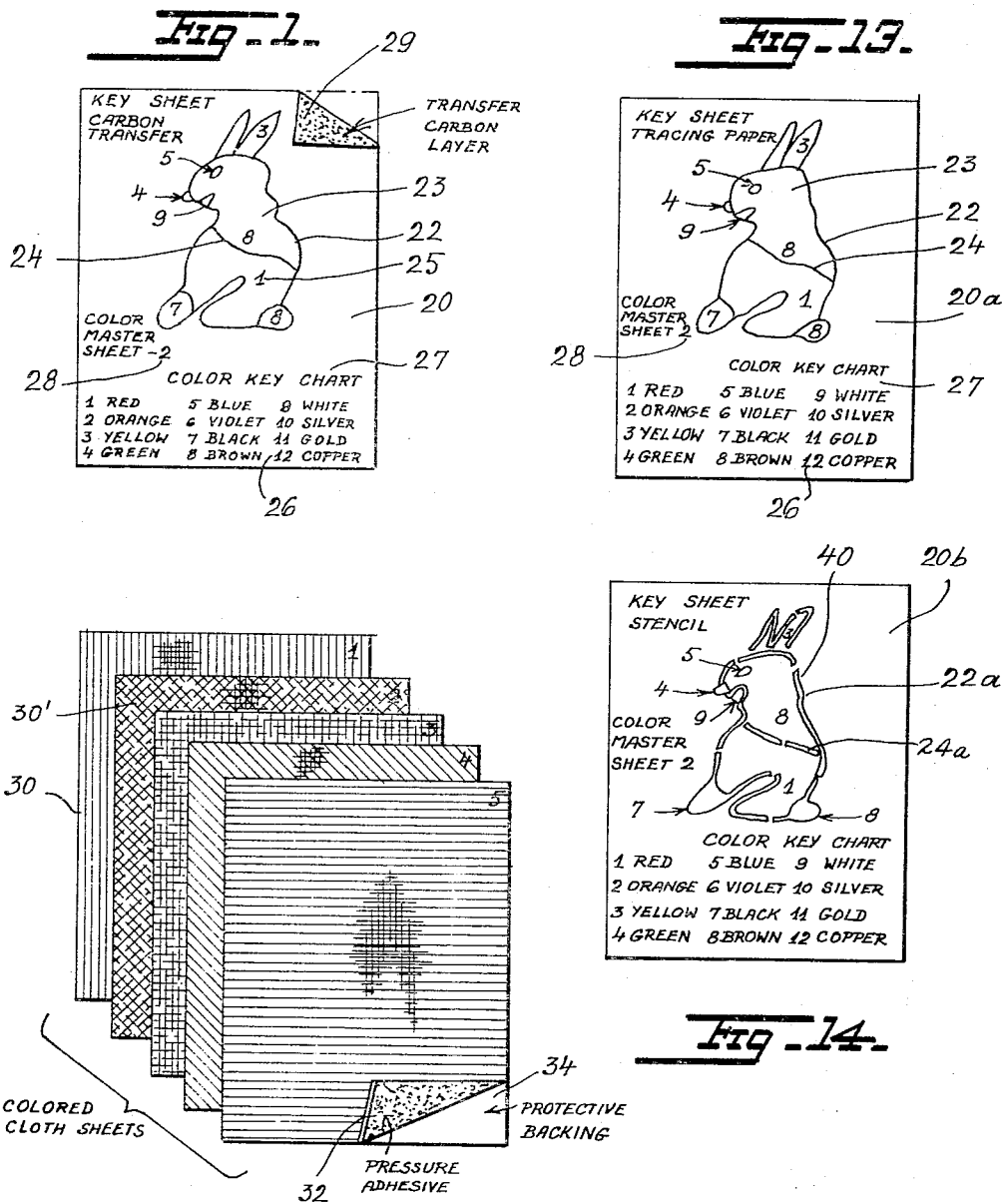

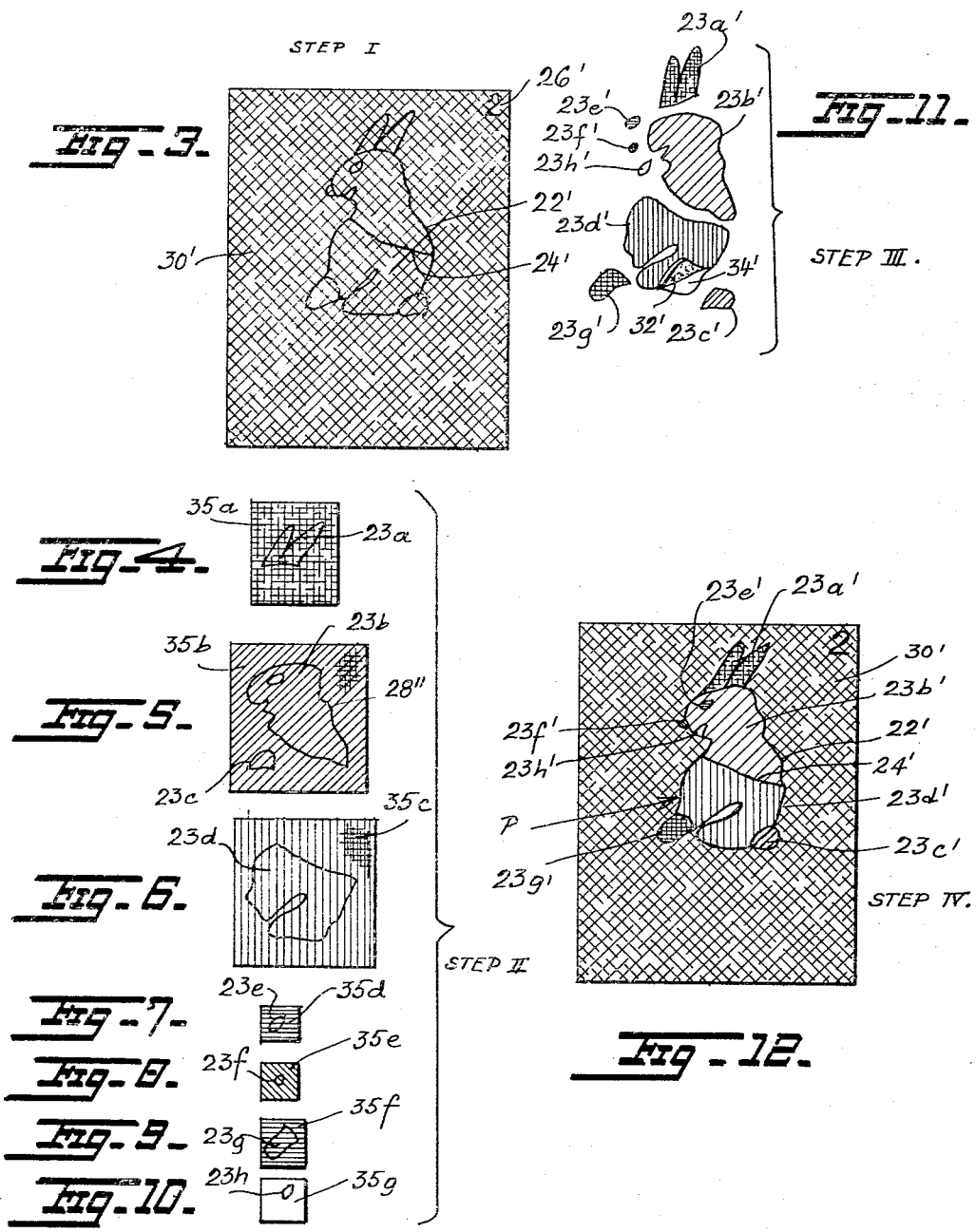

3,364,598
COMPOSITE PICTURES
James J. Cook, Lodi, N.J.
(11 Chapman Terrace, Middletown, N.J. 07748)
Filed Oct. 15, 1965, Ser. No. 496,627
1 Claim. (Cl. 35—26)

ABSTRACT OF THE DISCLOSURE

A means for assembling composite pictures from pieces of colored cloth, the pieces being cut from colored sheets, the shapes of the pieces being traced from a key pattern sheet.

---

This invention relates to the art of composite pictures and more particularly concerns patterns and pieces employed in assembling composite pictures.

A principal object of the invention is to provide simplified means for assembling composite pictures from pieces of colored cloth, the pieces being cut from colored sheets, the shapes of the pieces being traced from a key pattern sheet.

A further object is to provide a novel key pattern sheet for use in assembling composite pictures.

For further comprehension of the invention, and of the objects and advantages thereof, reference will be had to the following description and accompanying drawings and to the appended claim in which the various novel features of the invention are more particularly set forth.

In the accompanying drawings forming a material part of this disclosure:

FIGURE 1 is a plan view of a key pattern sheet according to the invention.

FIG. 2 is a plan view of an assemblage of colored sheets employed in practicing the invention.

FIG. 3 is a plan view of a master sheet employed in practicing the invention.

FIGS. 4–10 are plan views of parts of colored sheets used in one step in the procedure for assembling a composite picture.

FIG. 11 is a plan view of colored pieces used in another step in the procedure for assembling the composite picture.

FIG. 12 is a plan view of a composite picture.

FIG. 13 and FIG. 14 are plan views similar to FIG. 1 of modified key pattern sheets.

Referring first to FIG. 1 there is shown a key pattern sheet 20 made of paper or plastic material. On the front side of the sheet is an endless or continuous line 22 defining an outline of a pictorial object or figure. Sections 23 of the outlined object are defined by lines 24. Color key numbers 25 appear on or near each of the sections. These numbers correspond to color key numbers 26 listed in a color key or code chart or table 27 at the bottom of the sheet. Also marked on the sheet 20 is a color key number 28 for a designated color of master sheet 30' shown in FIG. 3. On the back of the sheet 20 is applied a layer 29 of transfer carbon substance.

FIG. 2 shows a plurality of colored cloth sheets 30 used in making a composite picture. Each sheet has a different color with a color key number 26 corresponding to one of the color key numbers 26 of chart 27 of the key pattern sheet. Applied to the back of each of the sheets 30 is a pressure sensitive adhesive layer 32. This layer is covered by a removable protective backing sheet 34.

FIGS. 3–12 to which reference is now made illustrates steps in a procedure for making a composite multicolored picture with colored background by means of the key pattern sheet 20 and colored sheets 30 described above.

To perform Step I illustrated in part by FIG. 3, a colored sheet 30' is selected from the group of sheets 30. This sheet has a color corresponding to the designation 28 on the pattern sheet 20. For example sheet 30' designated number 2 is orange colored. This sheet now becomes the master sheet in the procedure. Sheet 20 is placed over sheet 30' and the outline 22' and section lines 24' are inscribed thereon by tracing the outline 22 and lines 24 of sheet 20 with a stylus pencil, pen point, pin, nail or other pointed instrument. The outline 22' will be formed by carbon transfer from the layer 29.

Then in Step II illustrated in part by FIGS. 4–10, sheet 20 is placed in turn over selected colored sheets 30. Outlines 28'' are traced on the respective sheets to define picture sections 23a–23h corresponding to the outlined sections respectively on sheet 20.

After each section of the composite picture is outlined, a piece 35a–35g is cut out of each of the colored sheets, around the outlined picture sections 23a–23h.

In Step III shown partially in FIG. 11, all excess sheet material has been cut away from the pieces 35a–35g leaving pieces 23a'–23h' corresponding in shape to the outlined sections 23 on sheet 20. Then the backing sheet material 34' is stripped away from each of the pieces 23a'–23h' in turn to expose the adhesive substance 32'.

In Step IV partially shown in FIG. 12, the colored pieces are applied to sheet 30' in the outline 22'. The master section lines 24' locate the proper assigned position of each colored piece but are covered by the pieces 23a'–23h'. The self-adhering pieces are shown on sheet 30' in FIG. 12 defining the completed composite picture P.

This method of forming a composite picture is especially adapted for use by children. The children acquire skill in reading numbers, identifying colors, and using scissors to cut out pieces. Also they acquire manual dexterity in performing the several tracing and fitting operations required.

FIG. 13 shows another key pattern sheet 20a which can be employed in place of sheet 20. Sheet 20a is made of transparent tracing paper. The carbon tracing layer of sheet 20 is omitted. Instead a separate piece of carbon paper (not shown) is used. This carbon paper is interposed between sheet 20a and the sheet 30' in Step I and between sheet 20a and all the other sheets 30 in performing Step II.

The resulting outlines on sheet 30' and pieces 35a–35g will be same as shown in FIGS. 3–10. Step III then proceeds as described above to obtain the shaped pieces 23a'–23h'. The sheet 20a can be used by referring to it while the pieces 23a'–23h' are applied to sheet 30'. Alternatively, sheet 20a can be attached to sheet 30' as an overlay and the pieces can be inserted between sheets 20a and 30' instead the outline 22' with the proper locations of the pieces identified by the overlying outline 22 on sheet 20. In general section lines 24' will adequately locate the designated piece positions.

If desired in the interest of economy and for educational purposes, the backing sheets 34 and adhesive layers 32 can be omitted. The pieces 23a'–23h' will then be applied by means of a suitable glue or paste to the master sheet 30'.

FIG. 14 shows another key pattern sheet 20b which can be used in place of pattern sheets 20 and 20a. This sheet has slits 22a and 24a in place of inscribed lines 22 and 24. The slits terminate at bridge points 40. The outline 22' can be made on sheet 30' by overlaying it with the stencil pattern sheet 20b, and tracing the slits 22a and 24a with a pencil or ball point pen. Use of a supplemental carbon sheet is avoided. The child using this stencil gains manual dexterity in handling a pen or pencil and skill in mental and visual and manual coordination in tracing the slits. The resulting outlines on sheet 30' and pieces 35a–35h will be substantially the same as shown in FIGS. 3–10. Sheet 20b can be used as a reference sheet or overlay in assembling the cut picture pieces on sheet 30' if desired.

Although the invention is especially intended for use with colored cloth sheets, it will be understood that colored paper or plastic sheets can be substituted instead for any one or more of the colored sheets.

The invention may be used for combined play and educational purposes by young children. The several sheets can be made up and packaged in sets, or the several pattern sheets and colored sheets can be made up in books or bulk lots.

While I have illustrated and described the preferred embodiments of my invention, it is to be understood that I do not limit myself to the precise constructions herein disclosed and that various changes and modifications may be made within the scope of the invention as defined in the appended claim.

What is claimed is:

1. Means for assembling composite pictures, comprising a key pattern sheet having a color key chart thereon and having a continuous line thereon outlining a picture, and other lines within said outline defining sections of the picture on one surface thereof and having a layer of transfer carbon on the other surface, each of the sections having a symbol indicating a different color according to the key chart, and a plurality of differently colored sheets each having a color corresponding to one of the colors of the color chart on one surface thereof, said colored sheets having adhesive on the other surface thereof, whereby the outline and other lines of the picture on the key pattern sheet can be traced upon a colored master sheet selected from the colored sheets, whereby outlines of picture pieces of different shapes corresponding to the picture sections respectively on the key pattern sheet can be traced upon others of the colored sheets, and cut out of said other colored sheets, and whereby the cutout picture pieces can be applied to the master sheet within the traced outline thereon to form a composite multicolored picture with colored background.

References Cited

UNITED STATES PATENTS

| | | | |
|---|---|---|---|
| 282,659 | 8/1883 | Newman | 35—26 |
| 714,806 | 12/1902 | Lee | 35—26 X |
| 1,480,458 | 1/1924 | Mershan | 35—28 X |
| 1,541,480 | 6/1925 | Compton | 35—26 |
| 2,762,153 | 9/1956 | Knode | 35—26 X |
| 2,881,546 | 4/1959 | Gauthier | 35—26 X |
| 3,130,113 | 4/1964 | Silman | 35—26 X |
| 3,256,618 | 6/1966 | Varsky et al. | 35—26 |

FOREIGN PATENTS 951,184   3/1964   Great Britain.

EUGENE R. CAPOZIO, *Primary Examiner.*

H. S. SKOGQUIST, *Examiner.*